T. E. BUCK.
SAFETY HANGER FOR BRAKE BEAMS.
APPLICATION FILED FEB. 5, 1908.

903,954.

Patented Nov. 17, 1908.

Witnesses.
W. K. Hale.
Victor Georg.

Inventor.
Turney English Buck.
By Atty N. DuBois.

UNITED STATES PATENT OFFICE.

TURNEY ENGLISH BUCK, OF SPRINGFIELD, ILLINOIS.

SAFETY-HANGER FOR BRAKE-BEAMS.

No. 903,954.  Specification of Letters Patent.  Patented Nov. 17, 1908.

Application filed February 5, 1908. Serial No. 414,425.

*To all whom it may concern:*

Be it known that I, TURNEY ENGLISH BUCK, a citizen of the United States, residing at Springfield, in the county of Sangamon and State of Illinois, have invented a certain new and useful Safety-Hanger for Brake-Beams, of which the following is such a full, clear, and exact description as will enable others skilled in the art to which it appertains to make and use the same.

This invention relates to a safety device adapted to supplement any of the brake-hangers in common use; and is designed to prevent the falling of the brake beam in case of breakage of the brake-hanger, and thereby obviate accidents which otherwise might occur and which in fact do frequently occur, by reason of the breaking of the brake-hanger at one end of the beam and the falling of the brake beam onto the track where it catches on the rail or ties, and is very likely to cause derailment of the car, or other serious damage.

A prime purpose of the invention is to provide a safety hanger which will not interfere with the movement of the brake beam towards or away from the wheel but which will, in case of breakage of the primary brake hanger, support the brake beam so that it will not fall onto the track.

With these ends in view my invention consists in the novel features of construction and combinations of parts shown in the annexed drawing to which reference is hereby made and hereinafter particularly described and finally recited in the claim.

Figure 1:
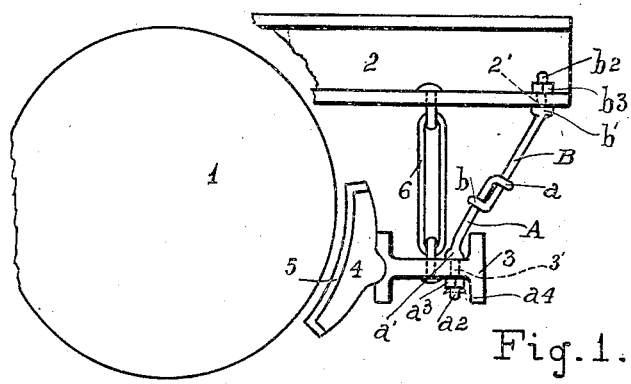
Figure 2:
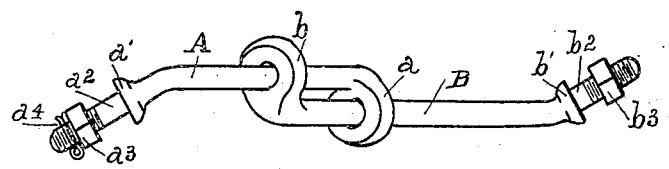

Referring to the drawing in which similar reference letters, numerals, and characters, designate like parts in the several views, Figure 1 is a side elevation of my improved safety-hanger in position on the truck of a car and connected with the brake beam and Fig. 2 is an enlarged isometric projection of the safety-hanger detached.

In the drawing 1 is a car wheel; 2 is the truck frame; 3 is the brake beam; 4 is the brake block; 5 is the brake shoe; and 6 is a link connected with the car truck and supporting the brake beam in the usual well known manner.

The safety-hanger is preferably of bar iron or steel and comprises two members A and B. The member A has at one end an eye $a$, and at the other end a screw threaded part $a^2$; and also has a shoulder $a'$. A nut $a^3$ fits on the screw threaded part $a^2$ and is secured by a cotter pin $a^4$ passing through the bolt. The member B has an eye $b$, a shoulder $b'$, a screw threaded part $b^2$ and a nut $b^3$ fitting on the screw threaded part $b^2$. The stem of the member A slides freely within the eye $b$, and the stem of the member B slides freely in the eye $a$.

I have shown and described a screw threaded part $b^2$ extending through a hole $2'$ and connecting the member B with the truck frame; and a screw threaded part $a^2$ extending through a hole $3'$ and connecting the member A with the brake beam; it is obvious however that any other suitable means for connecting the member B with the truck frame, and any other suitable means for connecting the member A with the brake beam, may be used without departure from my invention.

The gist of the invention subsists in two members one slidable lengthwise on the other; one member being fixed upon any suitable stable support and the other member being fixed on the brake beam.

I have shown a link 6 connected with the truck frame 2 and supporting the brake beam 3, but it is obvious that the brake beam may be supported by any suitable hanger connected with the truck or other suitable stable support.

In practice the member A slides on the member B to permit sufficient oscillation of the beam 3, limited by the distance between the eye members $b$ and $a$; and the parts are so connected and arranged that if the link 6 breaks or becomes disconnected, the member A will slide on the member B until the eye member $a$ strikes and stops against the eye member $b$, and when the parts are in that position the members A and B will support the brake beam and prevent it from falling onto the track.

Having fully described my invention what I claim as new and desire to secure by Letters Patent is:

The combination of a stable support, a safety-hanger member provided with an eye adapted to receive the stem of a complemental safety-hanger member also provided with a shoulder and a screw threaded part extending through said stable support, a nut securing said safety-hanger member on said stable support, a complemental safety-hanger member having an eye receiving the stem of said first named safety-hanger member and also having a shoulder and a screw threaded part, a brake beam having a hole receiving the screw threaded part of said complemental safety-hanger member; and a securing device securing said complemental safety-hanger member on said brake beam.

In witness whereof I have hereunto subscribed my name at Springfield Illinois this 28 day of Jan., 1908.

TURNEY ENGLISH BUCK.

Witnesses:
H. P. ANDERSON,
J. W. DAVISON.